(12) United States Patent
Sugiyama et al.

(10) Patent No.: US 7,508,102 B2
(45) Date of Patent: Mar. 24, 2009

(54) BRUSHLESS MOTOR HAVING A CIRCUIT BOARD HAVING A CENTRAL HOLE AND ESCAPE HOLES

(75) Inventors: Tomotsugu Sugiyama, Kyoto (JP); Akira Saiga, Kyoto (JP); Makoto Fujihara, Kyoto (JP); Yuji Yabuuchi, Kyoto (JP)

(73) Assignee: Nidec Corporation, Kyoto (JP)

( * ) Notice: Subject to any disclaimer, the term of this patent is extended or adjusted under 35 U.S.C. 154(b) by 278 days.

(21) Appl. No.: 11/214,028

(22) Filed: Aug. 30, 2005

(65) Prior Publication Data
US 2006/0043802 A1 Mar. 2, 2006

(30) Foreign Application Priority Data
Aug. 31, 2004 (JP) ............................. 2004-252585

(51) Int. Cl.
*H02K 3/50* (2006.01)
*H02K 11/00* (2006.01)

(52) U.S. Cl. ............. 310/67 R; 417/423.7; 417/423.12; 310/90; 310/71; 310/254; 310/68 B

(58) Field of Classification Search ............... 310/68 B, 310/68 R, 71, 155, 156, 67 R, 90, 91, 254, 310/DIG. 254; 417/354, 423.7, 423.12
See application file for complete search history.

(56) References Cited

U.S. PATENT DOCUMENTS 5,604,389 A * 2/1997 Nitta et al. ................ 310/67 R
5,663,604 A * 9/1997 Takahashi .................... 310/91
5,672,927 A * 9/1997 Viskochil .................... 310/194
6,762,518 B1 * 7/2004 Yamaguchi et al. ....... 310/67 R
6,922,002 B2 * 7/2005 Godo et al. ................. 310/216

(Continued)

FOREIGN PATENT DOCUMENTS

DE 10163587 * 7/2003

(Continued)

OTHER PUBLICATIONS

Translation of JP 11355996, Banbun Takahashi, "Maintainance Strucutre of Stator Winding Substrate", Dec. 24, 1999.*

*Primary Examiner*—Karl I Tamai
(74) *Attorney, Agent, or Firm*—Westerman, Hattori, Daniels & Adrian, LLP.

(57) ABSTRACT

In a brushless motor of the present invention, by disposing an electronic circuit board and a rotary magnet close to each other, detection precision of a magnetic pole of a Hall IC is enhanced, and a motor can be reduced in thickness. The electronic circuit board 4 is provided with an opening hole 41 and a notch portion 42 provided on an outer peripheral side of the opening hole 41. A lower insulator 32 of a stator 3 is provided with a positioning surface 32*a* with respect to the electronic circuit board 4 and an arc projection piece 32*c*. Portions of coil winding portions of teeth of the stator 3 are fitted into the electronic circuit board 4, a surface of the electronic circuit board 4 is brought into positioning against an positioning surface 32*a* of the lower insulator 32, and the notch portion 42 of the electronic circuit board 4 and the arc projection piece 32*c* of the lower insulator 32 are engaged with each other.

8 Claims, 6 Drawing Sheets

U.S. PATENT DOCUMENTS

2004/0212261 A1 * 10/2004 Uchiyama ................. 310/68 B
2006/0043802 A1 * 3/2006 Sugiyama et al. ......... 310/67 R

FOREIGN PATENT DOCUMENTS

| JP | 05-111226 | * | 4/1993 |
| JP | 11-355996 | * | 12/1999 |
| JP | 2002-5093 | | 1/2002 |

* cited by examiner

BRUSHLESS MOTOR HAVING A CIRCUIT BOARD HAVING A CENTRAL HOLE AND ESCAPE HOLES

BACKGROUND OF THE INVENTION

1. Field of the Invention

The present invention relates to a thin brushless motor.

2. Description of the Related Art

FIG. 6 shows a cross section of a structure of a fan motor that is one example of a conventional brushless motor.

The fan motor includes a cylindrical casing A. A bracket B is integrally formed on a central portion of one end of the casing A on its opening side through a plurality of radial arms. A cylindrical bearing holder C is fitted into a central portion of the bracket B.

A pair of bearings are held on an inner peripheral portion of the bearing holder C. A shaft F which is a center of a rotation portion is fitted into the pair of bearings. The rotation portion is supported by the bearings such that the rotation portion can rotate around the shaft F. A cup-like yoke K is fixed to an upper portion of the shaft F. In impeller H is fixed to an outer peripheral surface of the yoke K. A rotary magnet N is fixed to an inner peripheral surface of the yoke K. The rotary magnet N is opposed to a stator P through a gap in the radial direction. The stator P is fixed to an outer peripheral surface of the bearing holder C.

The stator P comprises a stator core having teeth and a winding wound around the teeth together with an insulator. An electronic circuit board Q is fixed to a lower portion (stationary portion) of the stator P. More specifically, the electronic circuit board Q is connected to the insulator such that a predetermined gap is formed between the electronic circuit board Q and the winding O of the stator P. An IC for controlling the fan motor rotation as a drive control circuit, a resistor, a capacitor, and a Hall IC Q1 are mounted on the electronic circuit board Q. The Hall IC Q1 for detecting a rotation position of a rotary magnet N is mounted on the electronic circuit board Q at a position opposed to the rotary magnet N in the axial direction. Predetermined current is allowed to flow to the winding O to operate the winding O and the stator P side as a stationary portion of the brushless motor, and to operate the yoke K and the rotary magnet N side as a rotation portion of the brushless motor. The electronic circuit board Q control the supply of current to the winding O to rotate the yoke K and the rotary magnet N side with respect to the winding O and the stator P side. The winding O and the electronic circuit board Q are connected to each other through a conductor (not shown). A lead wire R is connected to the electronic circuit board Q, the lead wire R is pulled out from the casing A through an arm, and electricity is supplied to the electronic circuit board Q from outside.

The brushless motor is driven by switching the current direction of the winding O of the stator P in synchronization with a magnetic pole position of the rotary magnet N. Therefore, a sensor for detecting the magnetic pole position of the rotary magnet N is required. A required condition of the sensor is to detect the magnetic field strength and polarity of the magnetic pole of the rotary magnet N. The Hall IC Q1 is in the mainstream as the sensor of the brushless motor. The magnitude of the output voltage and direction of the Hall IC Q1 becomes a product of the magnetic flux density and element current and thus, the Hall IC Q1 can detect the magnetic field strength and polarity. Since the output voltage of the Hall IC Q1 is proportional to the magnetic flux density, if the distance between the rotary magnet N and the Hall IC Q1 is small, i.e., if the axial distance S between the rotary magnet N and the Hall IC Q1 is small, the output voltage of the Hall IC Q1 becomes great correspondingly. Therefore, in the brushless motor, in order to precisely detect the magnetic pole position of the rotary magnet N, it is preferable that the rotary magnet N and the Hall IC Q1 are disposed close to each other.

In the conventional brushless motor structure, however, the electronic circuit board Q is disposed away from the winding O of the stator P by a predetermined distance. Thus, the axial distance S between the electronic circuit board Q and the rotary magnet N which is opposed to the stator P in the radial direction is long. Therefore, the magnetic flux density of the rotary magnet N which influences the Hall IC Q1 mounted on the electronic circuit board Q closer to the rotor becomes low, and there is a problem that the magnetic pole position of the rotary magnet N of the Hall IC Q1 cannot be detected satisfactorily.

Further, when the brushless motor is to be reduced in thickness, if the axial distances between the various parts are reduced, the winding O comes close to a surface of the electronic circuit board Q. Thus, the winding O adversely comes into contact with the electronic circuit board Q in some cases, and the height of the motor cannot be reduced. In addition, in the case of the brushless motor of this kind, the number of turns of the winding O of the stator P is determined in accordance with requirement of the motor characteristics. Thus, since the height of the winding is varied in accordance with the number of turns, the gap between the winding O and the electronic circuit board Q is also varied. As a result, the height of the winding is limited, and the freedom degree of the motor design is deteriorated.

BRIEF SUMMARY OF INVENTION

Hence, it is an object of the present invention to provide a brushless motor in which the electronic circuit board Q and the rotary magnet N can be disposed close to each other. It is another object of the invention to provide a brushless motor in which the magnetic pole position of the rotary magnet N of the Hall IC Q1 can be detected satisfactorily. It is another object of the invention to provide a brushless motor which can be reduced in thickness.

To achieve the above objects, the present invention provides a brushless motor comprising a stator, a rotor rotatably supported by a bearing and a circuit board, the stator including a stator core having teeth and a coil wound around each of the teeth, which forms a coil winding, the circuit board located downward to the stator in axial direction and the circuit board includes a central hole into which the bearing holder is loosely fitted, a plurality of escape holes which are connected to the central hole; wherein lower portions of the coil windings of the teeth are fitted into the escape holes of the circuit board.

With this brushless motor, a distance between the rotary magnet and the Hall IC can be shortened, as a result of which the output voltage of the Hall IC increases and the detection precision of the magnetic pole position can be enhanced. Further, the motor can be reduced in thickness. Even if the motor height is the same, since the position of the stator becomes lower, a spatial margin in the motor is increased by the reduction amount between the rotor and the stator in the axial direction. Thus, since the core can be wound more, the current and speed of the motor can be reduced. That is, the freedom degree of motor design is enhanced, and it becomes possible to satisfy requirements of motor characteristics in wider range.

There and other objects, features and advantages of the present invention will become more apparent upon reading of the following detailed description along with the accompanied drawings.

DETAILED DESCRIPTION OF INVENTION

Figure 1:
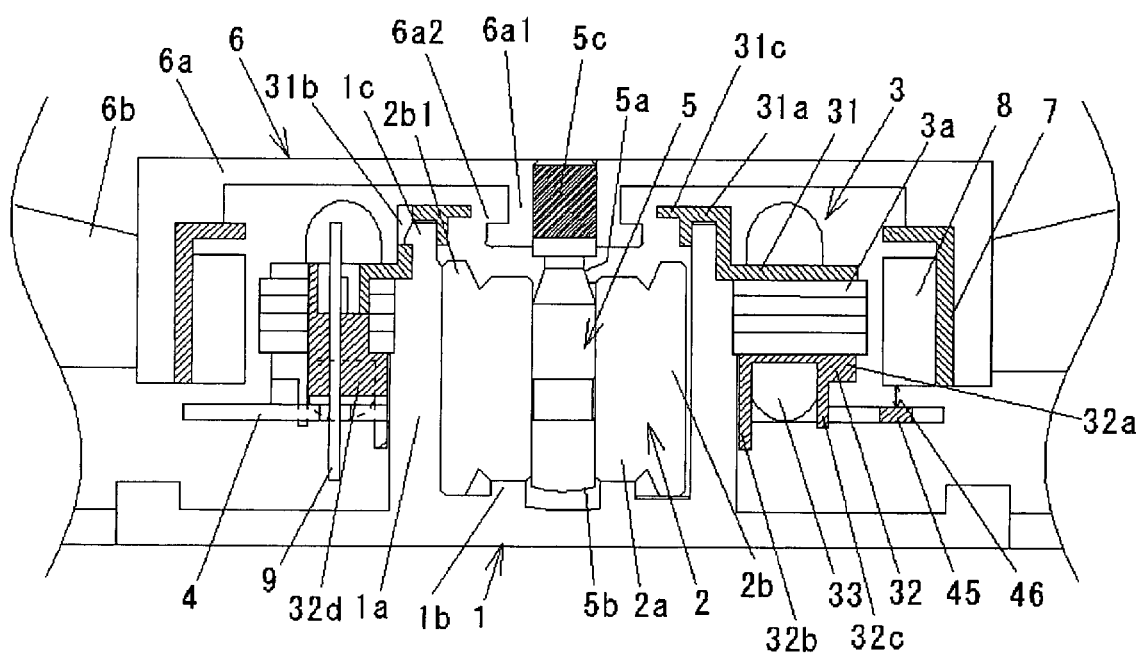
FIG. 1 is an axial sectional view of a motor according to the present invention.
Figure 2:
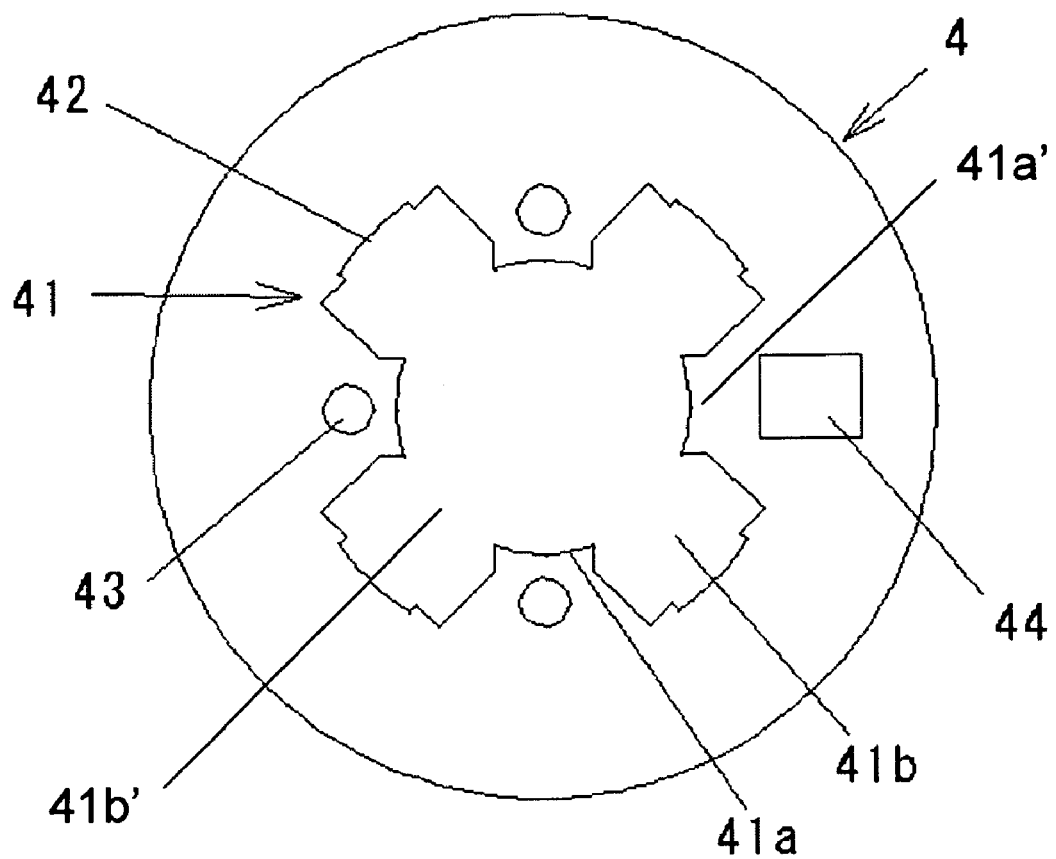
FIG. 2 is a diagram of an electronic circuit board used in the motor.
Figure 3:
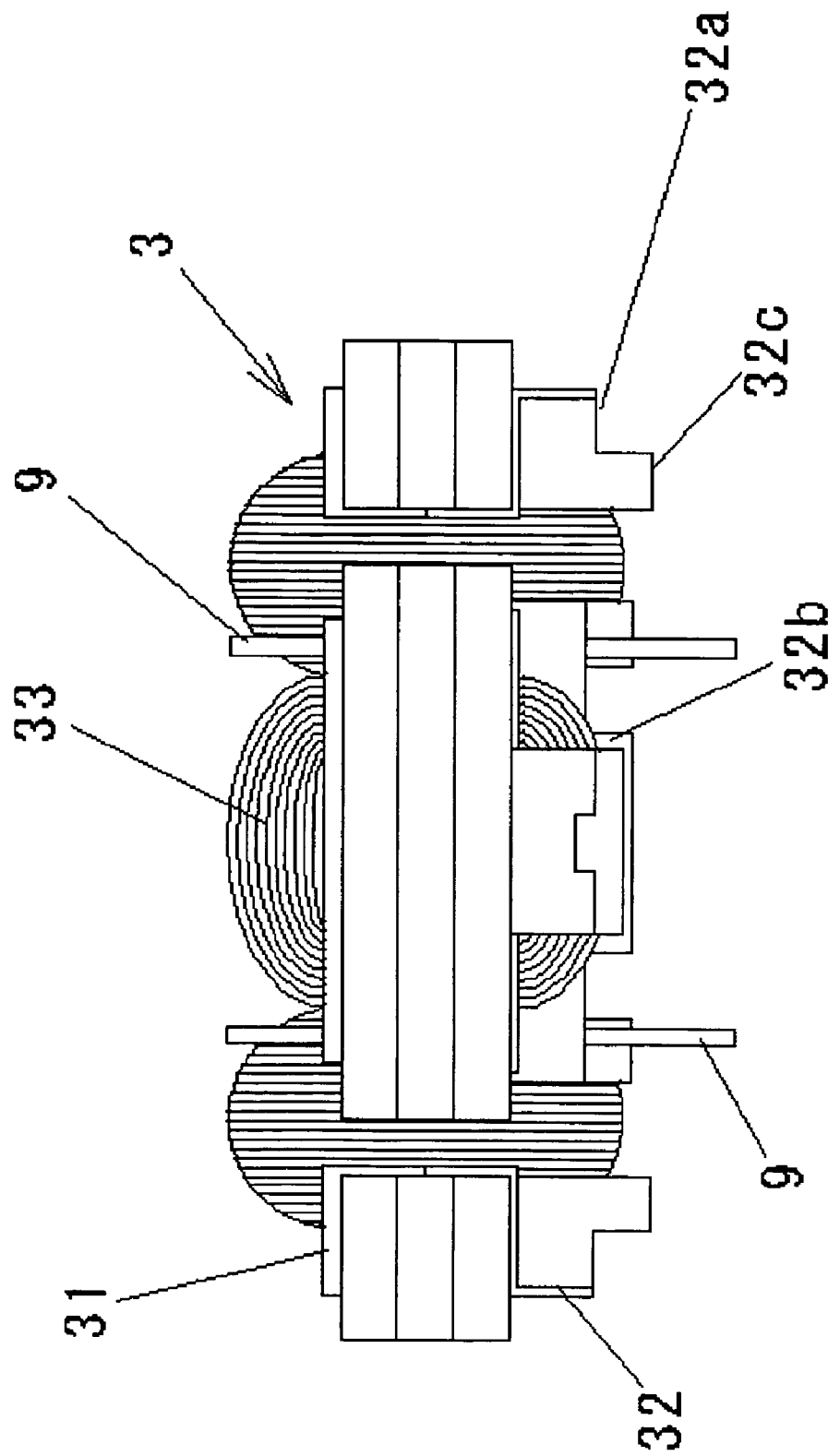
FIG. 3 is a diagram of a combination of the electronic circuit board and a stator used in the motor as viewed from a bracket.
Figure 4:
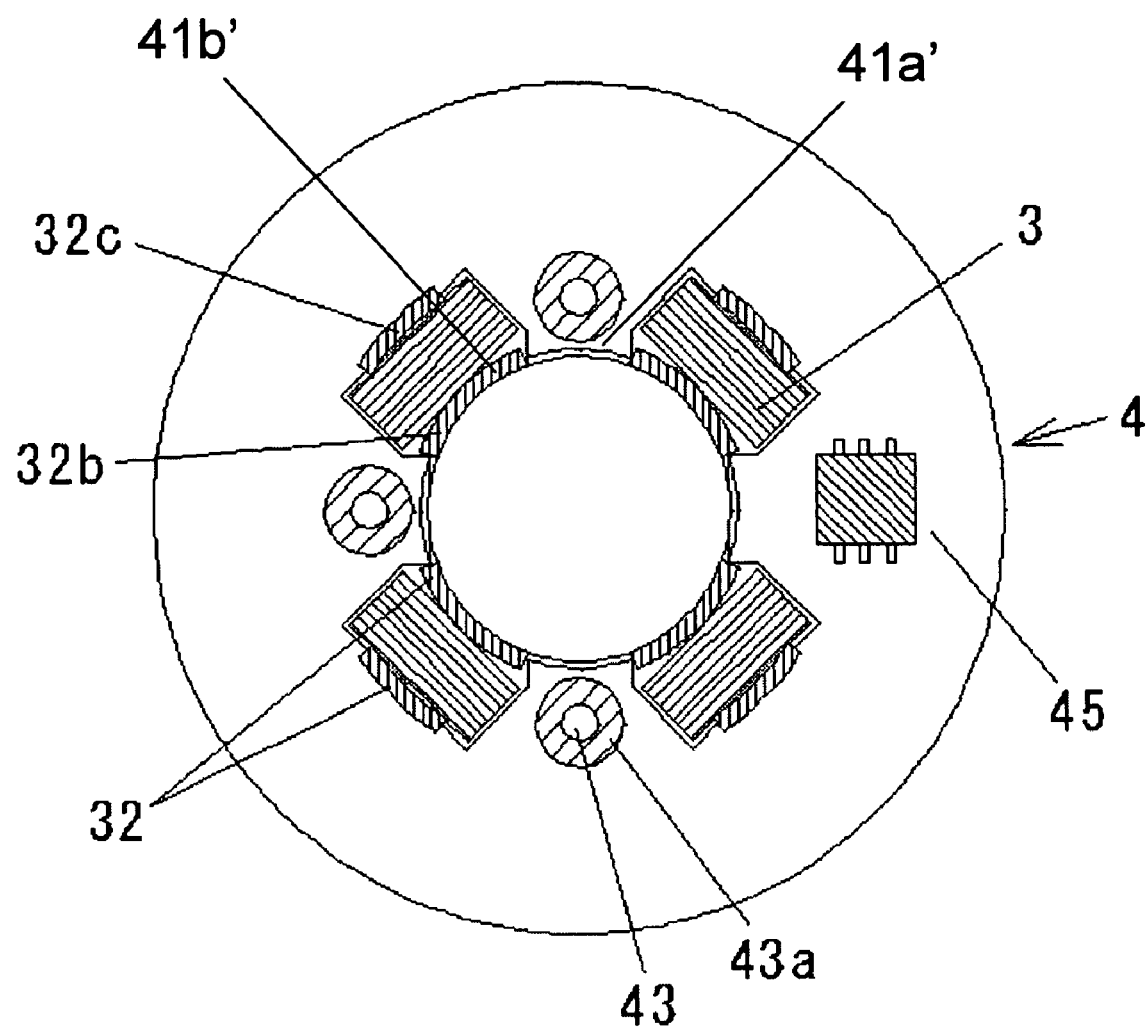
FIG. 4 is an enlarged view showing a positional relation between the electronic circuit board and the stator used in the motor.
Figure 5:
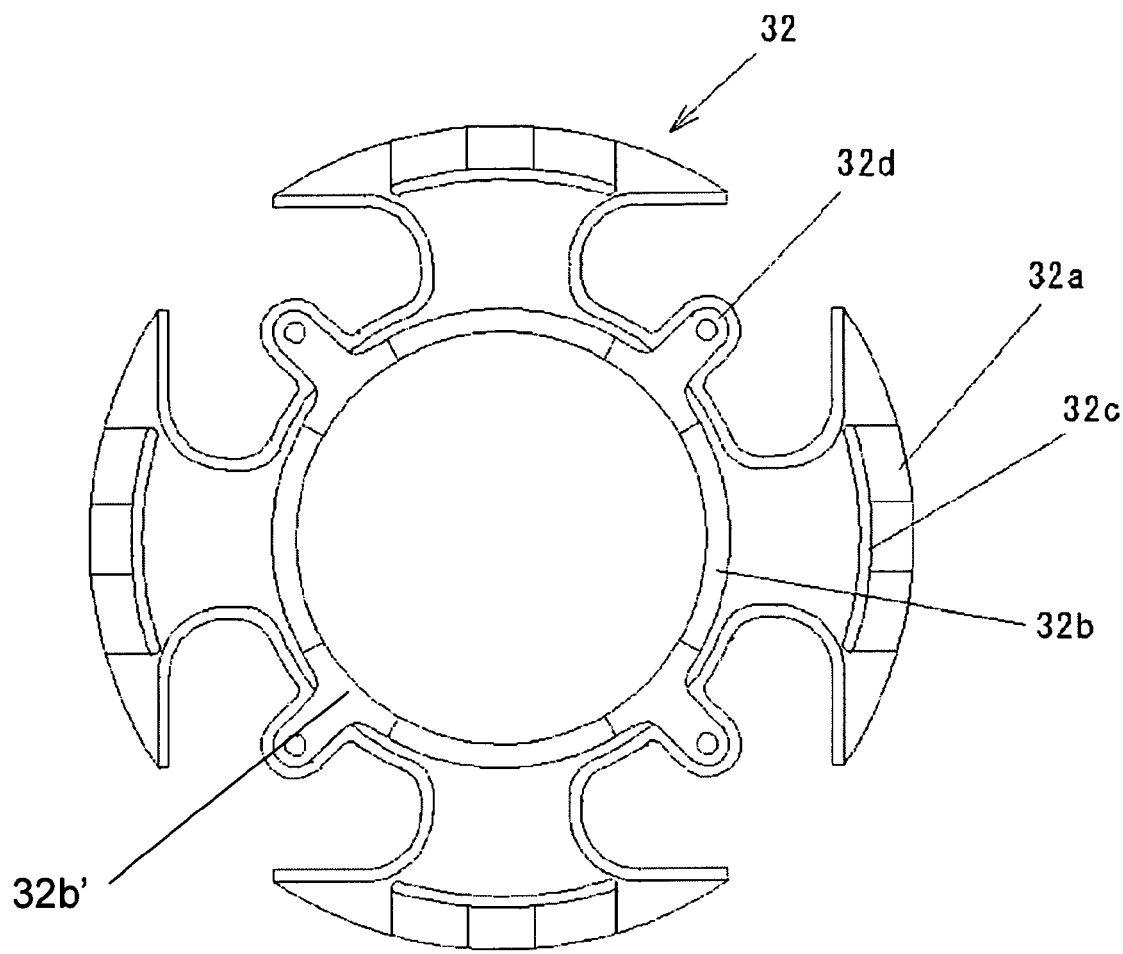
FIG. 5 is a diagram of a lower insulator used in the motor as viewed from below.
Figure 6:
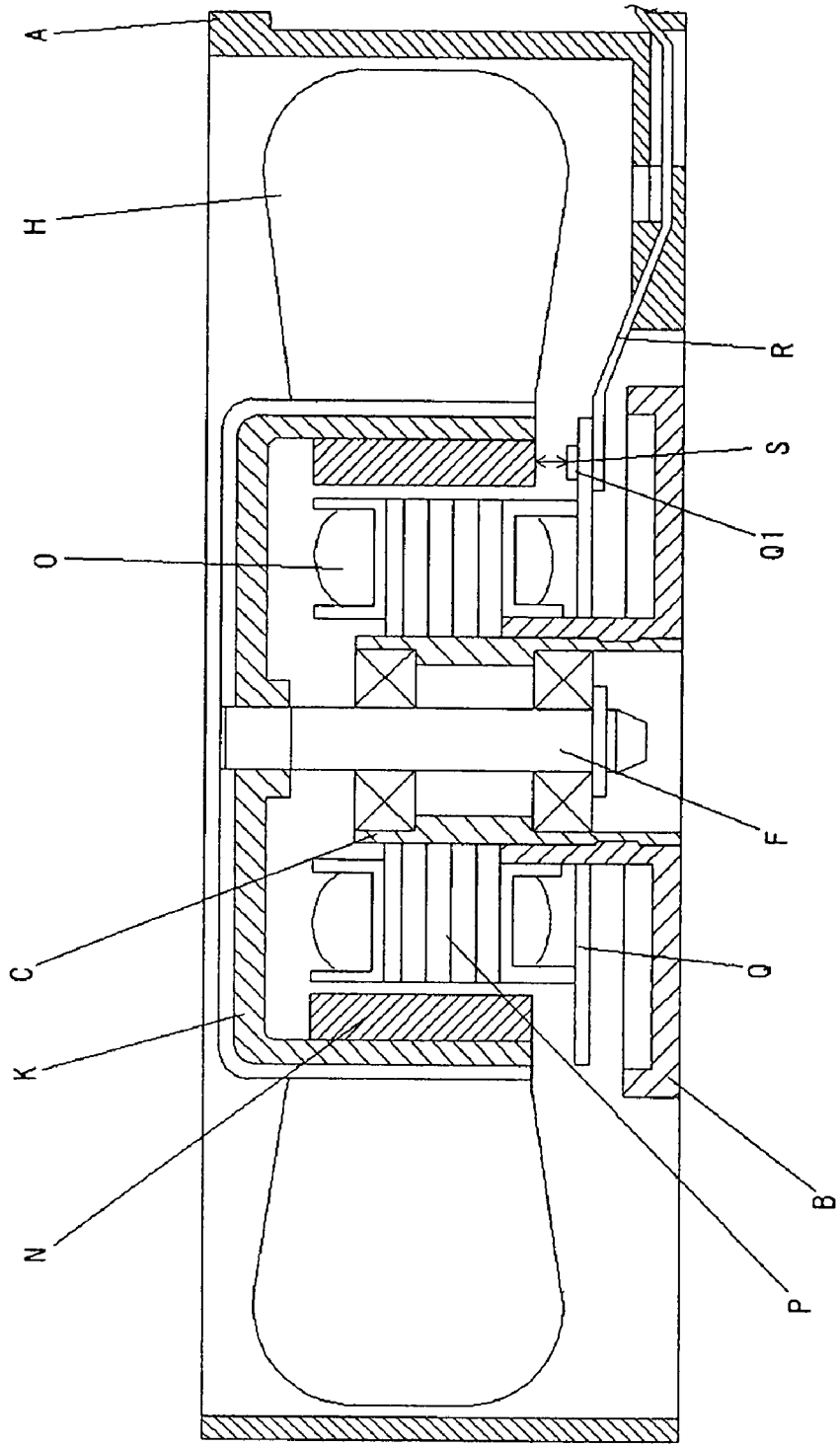
FIG. 6 is an axial sectional view showing a conventional motor.

An embodiment of the present invention will be explained with reference to the drawings. FIG. 1 is an axial sectional view showing an essential portion of a brushless motor of the invention applied to a fan motor. FIG. 2 is a plan view of an electronic circuit board. FIG. 3 is an enlarged view of a stator portion, and shows positions of a winding of the stator and the electronic circuit board, and a mounting relation therebetween. FIG. 4 is a diagram of the electronic circuit board as viewed from below, and is a diagram showing a relation between a portion of the winding of the stator and an opening hole of the electronic circuit board. FIG. 5 is a diagram of a lower insulator as viewed from below.

A shallow plate-like bracket 1 is integrally formed on a central portion of an opening side of one end of a housing of a fan motor. An upper portion of the bracket 1 is opened. The housing is provided at its central portion with a bottomed cylindrical bearing holder 1a extending upward. A substantially cylindrical bearing 2 is accommodated in the bearing holder 1a. The bearing holder 1a is provided at its central bottom surface with a projection 1b for supporting the inner bearing 2a. The bearing holder 1a is provided at its upper end with several holding pawls 1c for mounting a later-described insulator.

The bearing 2 is of a substantially two-stage cylindrical shape. The bearing 2 has an inner bearing 2a. The inner bearing 2a is fitted into an annular projection 1b located in the vicinity of a center of a bottom surface of the bearing holder 1a of the bracket 1 such that the inner bearing 2a abuts against the annular projection 1b. The outer bearing 2b is fitted into a shaft holder such that the outer bearing 2b abuts against the shaft holder. A shaft 5 which is a rotation center of a rotor is fitted into the bearing 2, and the shaft 5 is rotatably supported by the bearing 2. The bearing 2 is a plain bearing made of porous oil-impregnated metal. An inner peripheral surface of the bearing 2 functions as a bearing surface, and if the shaft 5 slides with respect to the inner peripheral surface, oil (lubricating oil) oozes from the surface. This oil (lubricating oil) becomes a medium between the shaft 5 and the inner peripheral surface, this prevents the shaft 5 and the inner peripheral surface from coming into direct contact with each other, and the shaft 5 is rotatably supported.

A stator 3 is fitted over the bearing holder 1a of the bracket 1. The stator 3 comprises an annular core 3a in which a plurality of (four in this embodiment) teeth are arranged in the circumferential direction in a laminated manner, insulative synthetic resin upper insulator 31 and lower insulator 32 which sandwich the core 3a from above and below and which covers substantially the entire surface of the core 3a except its inner peripheral surface and outer surfaces of the teeth in the circumferential direction, a coil 33 wound around the teeth of the core 3a through the insulators 31 and 32, and a conductive pin 9 for connecting the coil 33 to the electronic circuit board 4. An electronic circuit board 4 is fixed to a base end of the bracket 1 in the stator 3 by the lower insulator 32.

An annular mounting portion 31a is integrally formed on an inner peripheral portion of an upper end of the upper insulator 31. The mounting portion 31a has a reversed-U-shape cross section, and is provided at its inner peripheral direction with a projection 31c. The stator 3 is disposed on the mounting portion 31a such that an upper end of the bearing holder 1a is fitted to the mounting portion 31a. The mounting portion 31a is provided with several openings 31b into which the holding pawls 1c provided on the top of the bearing holder 1b of the bracket 1 are bonded. The openings 31b and the holding pawls 1c are elastically deformed and engaged with each other, and they function as detent members for the stator 3. The lower insulator 32 is provided at its positions corresponding to the teeth with an positioning surface 32a and inner peripheral and outer peripheral arc projection pieces 32b and 32c. The positioning surface 32a positions the electronic circuit board 4 in the axial direction. The arc projection pieces 32b and 32c positions the electronic circuit board in the circumferential direction. When the positioning surface 32a and the arc projection pieces 32b and 32c are provided, the lower insulator 32 is provided with a swelling portion 32d. The swelling portion 32d holds the conductive pin 9 in correspondence with a slot position between the teeth such that the conductive pin 9 penetrates the swelling portion 32d. The coil 33 is tied up on the upper end of the conductive pin 9, and a lower end of the conductive pin 9 is connected to the electronic circuit board 4. The projection piece 32b is disposed at the connecting portions 41b'. The inner portion 32b' is disposed between adjacent projection piece 32b when viewed from the below of the lower insulator 32. The projection piece 32b is fitted into the escape hole 41b. The inner portion 32b' faces the upper surface of the circuit board at a circumferential portion 41a'. The projection piece 32b and the inner portion 32b' surround the cylindrical bearing holder 1a.

The metal shaft 5 extends higher than the bearing 2. The shaft 5 is a cylindrical body having an outer diameter (large diameter surface) which is slightly smaller than that of the bearing 2, but the shaft 5 has a neck 5a comprising a surface which is reduced in diameter upwardly such that the surface is tapered upward from an upper surface of the shaft 5 when the shaft 5 is held by the bearing 2, and a surface (small diameter surface) whose outer diameter is uniformly small. A further upper portion of the shaft 5 reaches an upper end surface through a large diameter (large diameter surface). A portion of the shaft 5 corresponding to the bearing 2 includes a surface which is reduced in diameter downward in a tapered manner, a surface (intermediate diameter surface) whose outer diameter is uniformly small, and a surface whish is increased in diameter downward in a tapered manner. Further, a lower end of the shaft 5 reaches a lower end surface 5b through a large diameter (large diameter surface). The lower end surface 5b is a spherical surface.

The rotor 6 is fixed to the upper end of the shaft 5. The rotor 6 is integrally formed with a substantially bowl-like rotor frame 6a and a blade 6b formed on the outer peripheral side of the peripheral wall of the rotor frame 6a. A yoke 7 is fitted and fixed into the peripheral wall of the rotor 6. An upper end of the yoke 7 is inwardly bent, and the yoke 7 comprises a substantially cylindrical magnetic material. A cylindrical rotary magnet 8 is fitted and fixed into the yoke 7 such that the rotary magnet 8 is opposed to the stator 3. A base portion of the rotor frame 6a is supported by a boss 6a1 of the rotor frame 6a. An upper end 5c of the shaft 5 is formed with a knurl to enhance the adhesion when the shaft 5 is coupled to the boss 6a1 of the rotor frame 6a. When the rotor frame 6a is to be formed, the upper end 5c of the shaft 5 can be subjected to insert molding to integrally form them. A projection 6a2 located at a lower end of the boss 6a1 of the rotor frame 6a, an annular projection 2b1 of an outer periphery of the upper end of the bearing 2, and a projection 31c of the upper insulator 31 in an inner peripheral direction are combined with each other so as to form a labyrinth structure. This labyrinth structure prevents oil (lubricating oil) from the bearing 2 from scattering.

As shown in FIG. 2, the electronic circuit board 4 includes an opening hole 41, a through hole 43 through which the conductive pin 9 passes, and a through hole 44 for positioning the Hall IC 45. The opening hole 41 includes a circular central hole 41a into which the bearing holder 1a is loosely fitted, and four escape holes 41b which are brought into connection with the central hole 41a and which are opposed to the coil winding portions of the teeth. A notch portion 42 is formed in an outer side of each escape hole 41b. A drive control circuit IC, a resistor, a capacitor and the Hall IC 45 are mounted on the electronic circuit board 4. The Hall IC 45 is fitted into the through hole 44. The escape holes 41b are positioned on the electronic circuit board 4 at locations where the stator 3 is disposed. If the coil 33 is brought downward to bring the rotary magnet 8 and the upper surface of the electronic circuit board 4 close to each other (if the electronic circuit board 4 is brought upward), a portion of the coil 33 comes lower than the electronic circuit board 4, and the portion of the coil 33 is fitted into the opening hole 41 such that the coil 33 and the electronic circuit board 4 do not come into contact with each other as shown in FIG. 4.

The arc projection pieces 32b of the inner periphery of the lower insulator 32 are fitted into the escape holes 41b of the opening hole 41 of the electronic circuit board 4 on the side of the inner periphery, a positioning surface 32a of an insulator 32 is positioned against an upper surface of the electronic circuit board 4 which is closer to the rotary magnet 8, thereby assembling them. With this, axial positions of the stator 3 and the electronic circuit board 4 are precisely held. The Hall IC 45 is positioned and mounted on the through hole 44 such that the position of the upper surface of the electronic circuit board 4 and the position of the upper surface of the Hall IC 45 match with each other, the positional relation with respect to the rotary magnet 8 can be held excellently, and variation of the Hall IC 45 in position between products can be suppressed.

As shown in FIG. 5, four swelling portions 32d are provided for holding the conductive pin 9 of the lower insulator 32 in a penetrated manner. This is because that if the shape of the swelling portions 32d is vertically and laterally symmetric as shown in FIG. 5, it is easy to form the swelling portions 32d. The conductive pins 9 are held in the penetrated manner by three of the four swelling portions 32d. The electronic circuit board 4 is provided with three through holes 43 through which the conductive pins 9 pass. With this structure, when the stator 3 and the electronic circuit board 4 are mounted, if the three conductive pins 9 projecting from the lower insulator 32 are aligned with the three through holes 43 through which the conductive pins 9 of the electronic circuit board 4 pass, it is possible to easily determine the mounting direction of the stator 3 and the electronic circuit board 4.

The arc projection pieces 32c of the lower insulator 32 on the side of the outer periphery are elastically deformed and engaged with the notch portion 42 of the outer side of the opening holes 41 of the electronic circuit board 4. With this, the electronic circuit board 4 is held by the lower insulator 32. It is possible to precisely position the stator 3 and the electronic circuit board 4 in the circumferential direction. Therefore, the Hall IC 45 is disposed on a precise position with respect to the slot of the stator 3.

By assembling the stator 3 and the electronic circuit board 4, the conductive pins 9 project axially downward of the electronic circuit board 4. As shown in FIG. 4, a land 43a is formed around each through hole 43 on the lower surface of the electronic circuit board 4. The conductive pin 9 pulled out from the electronic circuit board 4 is soldered at the land 43a, and the stator 3 and the electronic circuit board 4 can be brought into conductive state through the conductive pin 9. Further, the electronic circuit board 4 and the stator 3 are fixed reliably to each other.

Since a portion of the coil 33 is disposed lower than the electronic circuit board 4, the position of the stator 3 can be lowered. Since the stator 3 and the rotary magnet 8 must be opposed to each other, it is necessary to also lower the rotary magnet 8. Thus, the rotary magnet 8 and the electronic circuit board 4 are brought closer to each other, and the distance 46 between the rotary magnet 8 and the Hall IC 45 can be shortened. With this, the output voltage of the Hall IC 45 is increased, and the detection precision of the magnetic position can be enhanced and thus, the magnetic position can be detected satisfactorily.

By lowering the position of the stator 3, the height from the electronic circuit board 4 to the upper portion of the coil 33 is reduced. With this, the axial length of each part can be shortened and thus, the motor can be reduced in thickness.

By lowering the position of the stator 3, the axial distance between the coil 33 of the stator 3 and the inner side of the rotor frame 6a is increased. Since the coil 33 can be wound around the teeth more by this increased distance, the limitation of the winding height is moderated, and the freedom degree of design is enhanced. Since the coil 33 can be wound more, even if the motor is driven at the same revolution number, current used for rotating the motor can be reduced. The motor can rotate at lower speed with the same current.

Although the embodiment of the brushless motor according to the present invention has been explained above, the invention is not limited to the embodiment, and the invention can variously be modified or corrected without departing from the scope of the invention. For example, although the swelling portion 32d is provided between the teeth of the lower insulator 32 for connecting the lower insulator 32 and the conductive pin 9 according to the present invention to each other, the swelling portion 32d may be provided on a lower portion of each tooth of the lower insulator 32, and the conductive pin 9 may be held.

The present invention has the following effects.

That is, the present invention provides a brushless motor comprising a housing including a cylindrical bearing holder, a stator, said stator including a stator core fitted over the bearing holder, an insulator covering each of teeth of the stator core, a coil wound around each tooth through the insulator, a rotor including a shaft which is rotatably supported by an inner side of the bearing holder through a bearing member, a substantially cylindrical rotary magnet which is mounted on the rotor such as to be opposed to the stator in the radial direction and which is polarized with multipolar, and a circuit board which is opposed to the stator in the axial direction and to which an end of the coil is connected; said circuit board including a central hole into which the bearing holder is loosely fitted, a plurality of escape holes which are in connection with the central hole and which are opposed to coil winding portions of the teeth, wherein portions of the coil winding portions of the teeth are fitted into the escape holes of the circuit board.

According to the invention, a distance between the rotary magnet and the Hall IC can be shortened. By increasing the output voltage of the Hall IC, the detection precision of the magnetic pole position can be enhanced. Further, the motor can be reduced in thickness. Even if the motor height is the same, since the position of the stator becomes lower, a spatial margin is increased by the reduction amount between the rotor and the stator in the axial direction. Thus, since the core can be wound more, the current and speed of the motor can be reduced. That is, the freedom degree of motor design is enhanced, and it becomes possible to satisfy requirements of motor characteristics in wider range.

In the invention, the insulator is formed with a positioning portion by which the circuit board is positioned at a predetermined position in the axial direction, and which defines a height position of the circuit board in the axial direction with respect to the stator core.

According to the invention, since the positioning portion of the lower insulator and the upper surface of the electronic circuit board abut against each other, it is possible to easily and reliably position the electronic circuit board with respect to the stator.

In the invention, axially long conductive pins are supported by the insulator at slot positions between the teeth of the stator, the coils wound around the teeth are connected to the conductive pins, and the conductive pins are connected to the circuit board.

According to the invention, the conductive pin is previously inserted into the insulator, the electronic circuit board is disposed on the positioning portion of the insulator while passing the conductive pin through the conductive pin through hole of the electronic circuit board. The conductive pin and the electronic circuit board are fixed to each other. It is possible to hold the insulator and the electronic circuit board more reliably. It becomes easy to mount the stator and the electronic circuit board and to position the stator and the electronic circuit board.

In the invention, a sensor hole is provided in the circuit board at a position opposed to the rotary magnet, and a rotor position detecting element for detecting a magnetic pole of the rotary magnet is disposed in the sensor hole.

According to the invention, it is possible to reliably position the rotor position detecting element and to precisely determine the positional relation with respect to the rotary magnet. Thus, the detection precision of the magnetic pole position can be enhanced. By matching the height of the surface of the electronic circuit board and the height of the upper surface of the Hall IC which is the rotor position detecting element with each other, the influence on the magnetic field generated from the coil can be suppressed.

In the invention, a notch portion is formed in a peripheral edge of at least one escape hole of the circuit board, a pawl which engages with the notch portion in the axial direction is formed in the insulator, and the pawl functions as a detent member of the circuit board with respect to the stator.

According to the invention, by engaging the pawl piece of the insulator with the notch portion, it is possible to reliably position the stator and the electronic circuit board in the circumferential direction. At the same time, this engagement also prevents the electronic circuit board from rotating.

This application is based on Japanese Patent Application serial no. 2004-252585 filed in Japan Patent Office on Aug. 31, 2004, the contents of which are hereby incorporated by reference.

What is claimed is:

1. A brushless motor comprising:
   a housing including a cylindrical bearing holder;
   a bearing portion disposed inside the bearing holder;
   a stator including an insulator, and a stator core having a plurality of teeth and coils, wherein each of the coils is wound around a corresponding one of the teeth, the stator being fixed to an outer surface of the bearing holder;
   a rotor with a rotary magnet fixed thereto, the rotor being supported in a rotatable manner about a rotational axis by the bearing portion, the rotary magnet being opposed to the stator in a radial direction perpendicular to the rotational axis;
   a circuit board disposed axially below the stator and electrically connected to the stator, wherein the circuit board has a central hole defining a plurality of connecting portions and a plurality of escape holes connected at the connecting portions to the central hole, the connecting portions being isolated from each other, the bearing holder being fitted into the central hole, lower portions of the coils of the stator being placed in the escape holes, respectively,
   wherein the insulator comprises inner projection portions disposed at the connecting portions, and inner portions disposed between adjacent inner projection portions when viewed from the below of the insulator, wherein the inner projection portions are fitted into the escape holes, wherein the inner portions face the upper surface of the circuit board at circumferential portions of the central hole.

2. The brushless motor according to claim 1, wherein the insulator further comprises outer projection portions disposed between the coils and outer circumferences of the escape hole, the outer projection portions being fitted in the escape holes; and a positioning surface extended from each of the projection portions, the positioning surface being positioned against an upper surface of the circuit board.

3. The brushless motor according to claim 2, wherein the inner projection portions and the outer projection portions radially sandwich the lower portions of the coils therebetween.

4. The brushless motor according to claim 2, wherein a notch portion engaging with each of the outer projection portions is provided on each of the outer circumferences of the escape holes.

5. The brushless motor according to claim 2, wherein the positioning surface faces the upper surface of the circuit board.

6. The brushless motor according to claim 1, further comprising a conductive pin which penetrates a swelling portion of the insulator and electrically connects ends of the coils to the circuit board.

7. The brushless motor according to claim 1, further comprising an IC operable to detect a magnetic pole of the rotary magnet, the IC being disposed between adjacent escape holes, wherein
   the circuit board has a sensor hole at a position axially opposed to the rotary magnet, the rotor position detecting element being disposed in the sensor hole.

8. The brushless motor according to claim 1, wherein the inner projection portions and the inner portions surround the cylindrical bearing holder.

* * * * *